(12) United States Patent
Carnevale et al.

(10) Patent No.: US 10,942,772 B2
(45) Date of Patent: *Mar. 9, 2021

(54) DISPATCHING JOBS FOR EXECUTION IN PARALLEL BY MULTIPLE PROCESSORS

(71) Applicant: International Business Machines Corporation, Armonk, NY (US)

(72) Inventors: Giulia Carnevale, Rome (IT); Marzia E. Castellani, Zagarolo (IT); Marco Gianfico, Sant'Antimo (IT); Roberto Ragusa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/417,800

(22) Filed: May 21, 2019

(65) Prior Publication Data

US 2019/0272196 A1    Sep. 5, 2019

Related U.S. Application Data

(63) Continuation of application No. 15/223,657, filed on Jul. 29, 2016, now Pat. No. 10,379,900.

(30) Foreign Application Priority Data

Mar. 7, 2016    (IT) .......................... 102016000023709

(51) Int. Cl.
G06F 9/46        (2006.01)
G06F 9/48        (2006.01)
G06F 9/50        (2006.01)

(52) U.S. Cl.
CPC .......... G06F 9/4881 (2013.01); G06F 9/5038 (2013.01); G06F 2209/483 (2013.01); G06F 2209/484 (2013.01)

(58) Field of Classification Search
CPC ........................................................ G06F 9/52
(Continued)

(56) References Cited

U.S. PATENT DOCUMENTS 5,293,620 A * 3/1994 Barabash .............. G06F 9/4881
                                                                    718/102
6,804,815 B1   10/2004 Kerr et al.
(Continued)

OTHER PUBLICATIONS

Office Action (dated Oct. 9, 2018) for U.S. Appl. No. 15/223,657, filed Jul. 29, 2016.

(Continued)

*Primary Examiner* — Mehran Kamran
(74) *Attorney, Agent, or Firm* — Schmeiser, Olsen & Watts, LLP; Nicholas L. Cadmus

(57) ABSTRACT

A method and system for dispatching jobs for execution in a computing system containing multiple processors that include one or more processors that retrieve an indication of a last processor of the processors of a current class to which a last job of jobs of the current class has been submitted for execution. A new job of multiple jobs has been assigned to the current class. The one or more processors retrieve an indication of a delta number of the jobs being submitted for execution to the last processor of the current class. The one or more processors submit the new job for execution to a submission processor of the multiple processors. The submission processor is set to a selected processor of the multiple processors according to a comparison between the delta number and the queue size of the last processor of the current class.

20 Claims, 6 Drawing Sheets

(58) Field of Classification Search
USPC .......................................................... 718/106
See application file for complete search history.

(56) References Cited

U.S. PATENT DOCUMENTS

| | | | | |
|---|---|---|---|---|
| 8,719,834 B2* | 5/2014 | Amano | ................ | G06F 9/5083 718/105 |
| 2002/0169816 A1* | 11/2002 | Meiri | ........................ | G06F 9/50 718/104 |
| 2005/0066328 A1* | 3/2005 | Lam | ...................... | G06F 9/5083 718/100 |
| 2007/0083871 A1* | 4/2007 | McKenney | ........... | G06F 9/5038 718/105 |
| 2011/0023044 A1 | 1/2011 | Krutyolkin et al. | | |
| 2011/0078696 A1* | 3/2011 | Blackburn | ............ | G06F 9/4881 718/104 |
| 2011/0078700 A1* | 3/2011 | Blackburn | .............. | G06F 9/505 718/105 |
| 2011/0154089 A1* | 6/2011 | Wolfe | ........................ | G06F 1/04 713/501 |
| 2011/0154346 A1* | 6/2011 | Jula | ........................ | G06F 9/4881 718/103 |
| 2011/0276978 A1* | 11/2011 | Gaiarsa | ..................... | G06F 9/46 718/104 |
| 2011/0296212 A1* | 12/2011 | Elnozahy | .............. | G06F 9/5044 713/320 |
| 2012/0013943 A1* | 1/2012 | Shibao | ................ | G06K 15/1806 358/1.15 |
| 2012/0079501 A1* | 3/2012 | Sandstrom | ............ | G06F 9/5066 718/105 |
| 2012/0110572 A1* | 5/2012 | Kodi | ..................... | G06F 9/5027 718/1 |
| 2012/0117567 A1* | 5/2012 | Amano | ................. | G06F 9/5077 718/1 |
| 2012/0162689 A1* | 6/2012 | Hayashi | ................ | G06F 3/1215 358/1.14 |
| 2012/0167119 A1* | 6/2012 | Liss | ........................ | G06F 9/544 719/318 |
| 2012/0254879 A1* | 10/2012 | Chung | ................... | G06F 9/5066 718/102 |
| 2013/0198752 A1* | 8/2013 | Benhase | ............. | G06F 12/0868 718/102 |
| 2014/0052882 A1* | 2/2014 | Waters | ................... | G06F 9/4843 710/267 |
| 2014/0082629 A1* | 3/2014 | Ash | ........................... | G06F 9/46 718/105 |
| 2014/0379320 A1 | 12/2014 | Tal et al. | | |
| 2014/0380320 A1* | 12/2014 | Lin | ........................ | G06F 9/4881 718/102 |
| 2015/0121387 A1* | 4/2015 | Chang | ................... | G06F 9/4881 718/103 |
| 2015/0121388 A1* | 4/2015 | Chang | ........................ | G06F 9/52 718/103 |
| 2015/0150014 A1 | 5/2015 | Sar et al. | | |
| 2015/0248313 A1* | 9/2015 | Vijayarangan | ........ | G06F 9/5011 718/104 |
| 2015/0324234 A1* | 11/2015 | Chang | ................... | G06F 9/5033 718/104 |
| 2016/0026507 A1* | 1/2016 | Muckle | ................. | G06F 9/5094 718/104 |
| 2016/0098300 A1* | 4/2016 | Chang | ................... | G06F 9/4881 718/103 |
| 2017/0235605 A1* | 8/2017 | Chaloupka | ............ | G06F 9/4881 718/103 |
| 2017/0242733 A1* | 8/2017 | Qi | ........................ | G06F 9/3851 |
| 2017/0255500 A1 | 9/2017 | Carnevale et al. | | |

OTHER PUBLICATIONS

Amendment (dated Jan. 9, 2019) for U.S. Appl. No. 15/223,657, filed Jul. 29, 2016.

Notice of Allowance (dated Mar. 27, 2019) for U.S. Appl. No. 15/223,657, filed Jul. 29, 2016.

* cited by examiner

DISPATCHING JOBS FOR EXECUTION IN PARALLEL BY MULTIPLE PROCESSORS

This application is a continuation application claiming priority to Ser. No. 15/223,657, filed Jul. 29, 2016.

TECHNICAL FIELD

The present invention relates to data processing and more specifically, to the dispatching of jobs for computer execution in parallel.

BACKGROUND

The execution of different jobs (or tasks) in parallel by a plurality of processors, generally provided with corresponding First-In First-Out (FIFO) queues, is a technique that is widely used to improve performance of a corresponding computing system (for example, a network switch). Generally, the jobs are any computing (sub) activities that may be executed independently to implement larger computing (complex) activities (for example, processing of data frames of network messages), and then the jobs may be executed at any time by the processors (for example, cores of a microprocessor). Therefore, the jobs may be submitted for execution to the processors so as to obtain execution of the jobs simultaneously as far as possible. Typically, the jobs are distributed to the processors in an attempt to optimize use of the processors (for example, in terms of idle times, load balancing).

However, the parallel execution of the jobs does not allow controlling the execution order of the jobs. Indeed, since the processors execute the jobs independently, a job that has been submitted after another job may nevertheless be executed before the other job (for example, when the corresponding processor is less busy)

Classes may be associated statically with the processors, which may cause a (random) load unbalancing of the processors since the jobs of each class are submitted always to the same corresponding processor even if the same corresponding processor is busy and other processors are instead idle.

Conversely, it is possible to have more classes than processors and then to assign the classes to the processors dynamically according to the current workload of the processors. For this purpose, a dispatcher (controlling the submission of the jobs to the processors) has to track the execution of the jobs so as to identify (at any moment) a number of the (pending) jobs of each class that have been submitted for execution but that are still waiting to be executed. In this way, when the number of pending jobs of a class is zero, each new job of the same class may be submitted to whatever processor (to optimize load balancing); otherwise, each new job of this class has to be submitted to the same processor on which the pending jobs of the same class are still waiting to be executed (to respect possible execution dependencies).

However, this execution tracking of the jobs may be not possible when the processors are unable to notify the completion of the execution of the jobs to the dispatcher (for example, when the queues of the processors are inherently mono-directional, such as in case of execution of the jobs by sending data frames onto a network).

In any case, even when the execution tracking is possible, the corresponding notifications of the completion of the execution of each job by each processor to the dispatcher generates a heavy exchange of information (among the processors and the dispatcher), which may result in significant inefficiency. Particularly, these notifications may cause a contention bottleneck at the dispatcher, with detrimental effects on its performance and then of the whole computing system).

Moreover, the execution tracking of the jobs by the dispatcher requires the allocation of a corresponding storage area thereof; this storage area may become relatively large when the number of classes/processors increases.

SUMMARY

The present invention provides a method, and associated system and computer program product, for dispatching a plurality of jobs for execution in a computing system comprising a plurality of processors adapted to execute the jobs in parallel. Each processor is associated with a queue size indicative of a maximum number of the jobs that may be queued to the processor waiting for execution by the processor after submission for execution thereto. A request of execution of a new one of the jobs is received. The new job is assigned to a current one of a plurality of classes, the classes being defined to have the jobs of different classes without execution dependencies. An indication is retrieved of a last one of the processors of the current class to which a last one of jobs of the current class has been submitted for execution. An indication is retrieved of a delta number of the jobs being submitted for execution to the last processor of the current class after the last job of the current class. The new job is submitted for execution to a submission one of the processors, the submission processor being set to the last processor of the current class or to a selected one of the processors according to a comparison between the delta number and the queue size of the last processor of the current class.

DETAILED DESCRIPTION

The present invention is based on the idea of counting the jobs submitted to each processor.

An aspect of the present invention provides a method for dispatching jobs, wherein each job is assigned to a current class (of a plurality of classes defined to have the jobs of different classes without execution dependencies) and is submitted for execution to a processor determined according to a comparison between a delta number (i.e., the number of jobs that have been submitted for execution to a last processor of the current class after a last job of the current class) and a queue size of the last processor of the current class.

A further aspect of the present invention provides a software program and a computer program product for implementing methods of the present invention.

A further aspect of the present invention provides a corresponding dispatching system and a computing system comprising the dispatching system.

Figure 1:
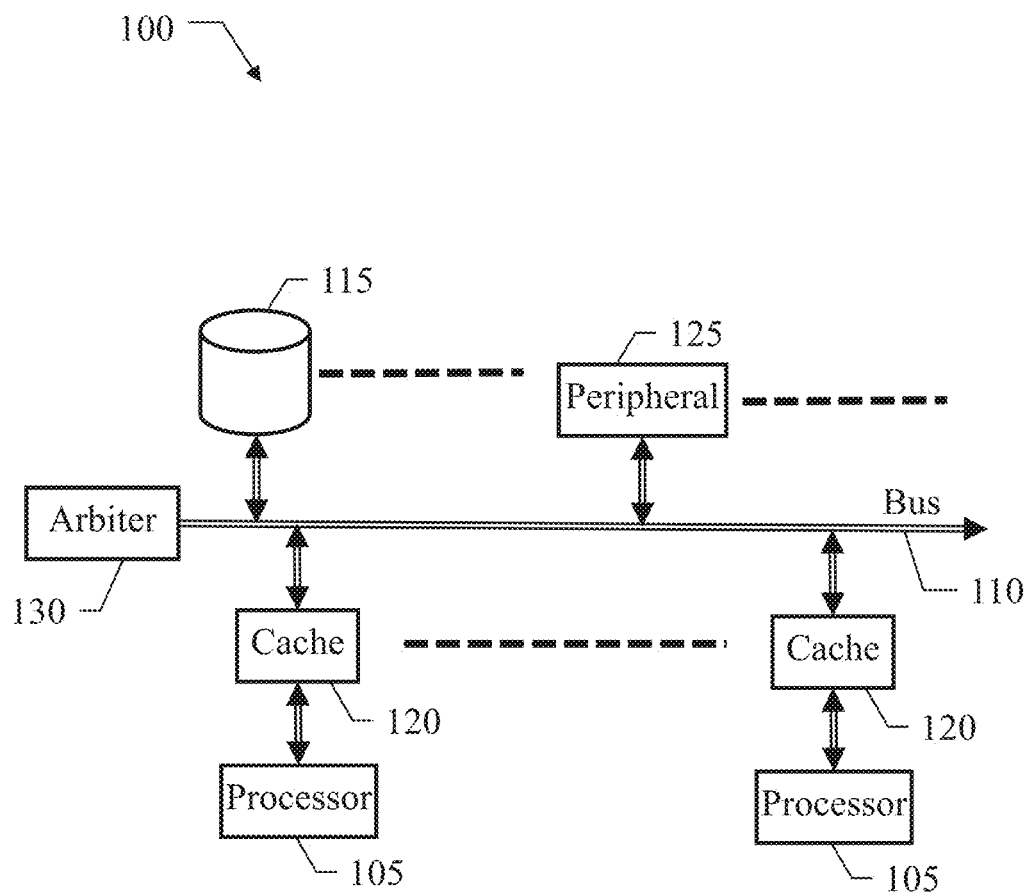
FIG. 1 shows a diagram of a computing system configured to implement embodiments of the present invention.

FIG. 1 shows a diagram of a computing system 100 configured to implement embodiments of the present invention.

The computing system 100 has a parallel processor architecture with a plurality of processors 105 (for example, two 32-bit processors). In one embodiment, the computing system 100 has a symmetric multiprocessing (SMP) architecture, wherein the processors 105 are identical. Moreover, the processors 105 are tightly coupled through a communication structure (for example, a bus structure 110 allowing the processors 105 to share a main memory 115). For example, the (shared) main memory 115 may comprise a read only memory (ROM) storing basic code for a bootstrap of the processors 105, a random access memory (RAM) used as a working memory by the processors 105, and a mass memory storing data to be preserved even when a power supply is off (for example, one or more hard-disks). Each processor 105 may have a (private) cache memory 120 (of small size but very fast in one embodiment) for reducing the accesses to the main memory 115 and then the traffic on the bus structure 110. The processors 105 further share different peripheral (input and/or output) units 125 through the same bus structure 110. For example, the peripheral units 125 may comprise drives for reading/writing removable storage devices (for example, optical disks, USB keys), a keyboard, a mouse, a monitor, one or more network adapters. An arbiter 130 manages the granting of the access to the main memory 115 with mutual exclusion to the bus structure 110.

The processors 105 may execute different jobs (e.g., independent computing activities) in parallel. The jobs may be executed independently at any time but respecting possible execution dependencies thereof (i.e., logical relations requiring corresponding execution orders). The jobs are submitted for execution to the processors 105 so as to obtain execution of the jobs simultaneously, as far as possible according to execution dependencies between or among the jobs. To implement the simultaneous execution of the jobs, the jobs are classified into disjoint classes (defined so that jobs belonging to different classes have no execution dependencies among the jobs belonging to the different classes). The execution of the jobs of each class is controlled to ensure that the job executions happen in the order required to respect the (possible) execution dependencies between or among the jobs of each class.

For example, the computing system 100 may include a (network) switch that allows different devices of a network (for example, computers of a LAN), connected to corresponding ports of network cards of the switch, to communicate among the the devices. Particularly, the switch forwards data frames (or packets) among the devices by transmitting each data frame that is received from a corresponding source device only to a destination device which is intended to receive each data frame. In one embodiment, the execution of each job may be the processing of a corresponding data frame for forwarding the corresponding data frame, which processing may be performed in parallel by multiple cores of a microprocessor of the switch. The classes may be defined by the source devices and the destination devices of the data frames. The data frames having different source devices and/or destination devices are independent. Thereas those data frames having the same source devices and destination devices are to be processed in the order corresponding to the flow of those data frames (which defines a corresponding execution dependency).

Figure 2A:
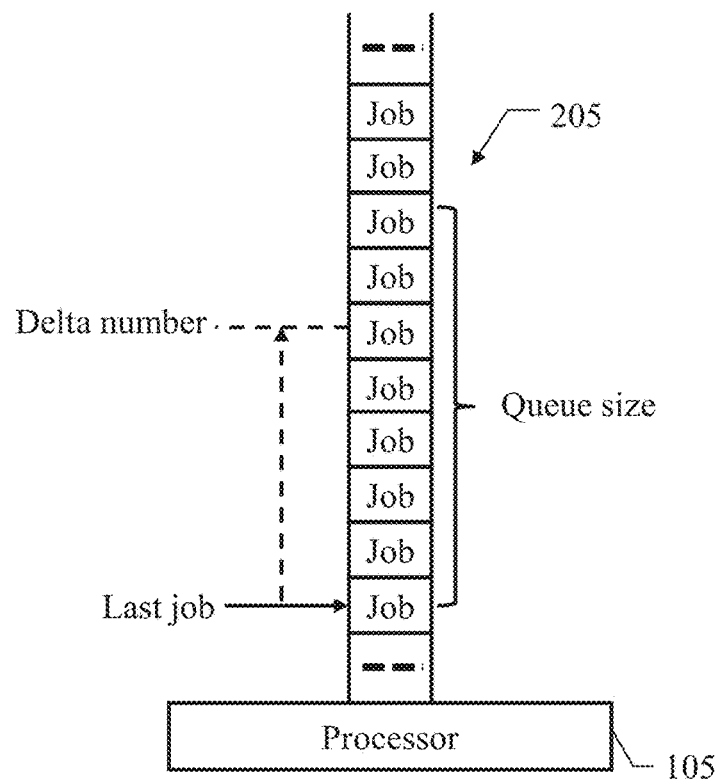
FIGS. 2A-2B show general principles for implementing embodiments of the present invention.
Figure 2B:
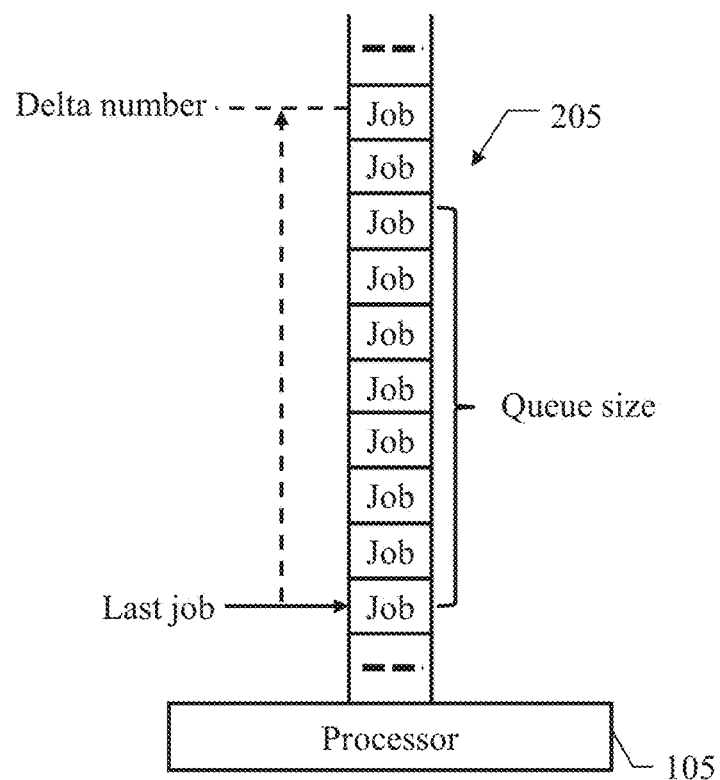

FIGS. 2A-2B show general principles for implementing embodiments of the present invention.

Starting from FIG. 2A, each processor 105 (only one processor shown in FIG. 2A) implements a corresponding (processor) queue 205 with a First-In First-Out (FIFO) structure for the jobs that have been submitted for execution but are still waiting to be executed. For this purpose, each (new) job that is submitted to the processor 105 is added to a first free location of the queue 205 moving backwards from a front location (head shown as location nearest the processor 205) towards a rear location (tail shown as location furthest from the processor 205). As soon as possible, the processor 105 executes each job at the head of the queue 205. At the same time, the processor 105 removes this job at the head of the queue 205 from the queue 205 with all the other jobs in the queue 205 shifting forwards (towards the head) by one location. In this way, the queue 205 ensures that the jobs are executed in the same order in which the jobs have been submitted to the processor 105. The queue 205 has a (queue) size defined by the queue's number of locations (for example, 4 to 16 locations). The queue size represents the maximum number of jobs that may be in the queue 205 (i.e., queued to the processor 105, waiting for execution by the processor 105 after submission of the jobs to the processor 105). When the number of the jobs that are queued reaches the queue size, the queue 205 is full. When the queue 205 is full, the processor 105 does not accept the submission of any further job until the job at the head of the queue 205 is executed, thereby clearing a location at the tail of the queue 205 for submission of a new job.

According to an embodiment of the present invention, whenever a new job has to be executed, the new job is assigned to a corresponding (current) class. An indication is then retrieved of a last processor of the current class, to which a last job of the current class has been submitted (the processor 105 being shown in FIG. 2A in the example at issue). At this point, an indication is retrieved of a delta number. The delta number represents the number of (next) jobs, of any class, that have been submitted to the last processor 105 after the last job (of the current class). The new job is then submitted to a (submission) processor. The submission processor is determined according to a comparison between the delta number and the queue size of the last processor 105.

In FIG. 2A, the situation is shown wherein the delta number is lower than (or qual to) the queue size (8) of the corresponding queue 205 of the last processor 105. For example, at most 8 jobs may be queued to the last processor 105 and 5 next jobs have been submitted to the last processor 105 after the last job (identified by a corresponding arrow in the corresponding queue 205). In this case, the new job is submitted to the same last processor 105. Indeed, when the delta number is lower than the queue size of the last processor 105, it is not possible to ensure that the last job has already been executed by the last processor 105. Particularly, in the worst situation the last job may have been submitted to the last processor 105 when the queue 205 had only one free location (and then the queue 205 of the last processor 105 became full afterwards). In that case, the last job is still in the queue 205 waiting to be executed (when the delta number is lower than the queue size) or at most is currently in execution by the last processor 105 (when the delta number is equal to the queue size). Therefore, since both the last job and the new job belong to the same current class (so that it is not possible to exclude some execution dependency between the last job and the new job), only the submission of the new job to the current processor 105 ensures that the new job is executed after the last job (since the new job follows the last job in the queue 205).

Moving to FIG. 2B, the situation is instead shown wherein the delta number is higher than the queue size of the last processor 105. For example, in FIG. 2A at most 8 jobs may be queued to the last processor 105, but now 9 next jobs have already been submitted to the last processor 105 after the last job. In this case, the new job may be submitted to any processor that is selected among all the processors that are available (either the same as or different from the last processor 105). Indeed, when the delta number is higher than the queue size of the last processor 105. It is possible to ensure that the last job has already been executed by the last processor 105. Particularly, even in the worst situation rein the last job has been submitted to the last processor 105 when the queue 205 had only one free location), the first next job (submitted to the last processor 105 directly after the last job) has already crossed the whole queue 205 by exiting from the head of the queue 205 for execution by the last processor 105 after the execution of the last job. Therefore, since no execution dependency has to be respected between the new job and the last job (already executed), no corresponding constraint applies to the choice of the processor for the submission of the new job.

The above described solution provides a good load balancing of the processors, with a high parallelism of the execution of the jobs by the processors (at the same time ensuring the respect of any execution order thereof). Particularly, tests performed on different combinations of numbers of processors and queue sizes have provided an efficiency index (defined by a percentage of the processors that are busy at any time) close to the theoretical value of 100% wherein all the processors are always busy (for example, of the order to 94-99%, with an increase of 10-20% with respect to standard dispatching techniques)

This solution is of general applicability, without requiring any notification of the completion of the execution of the jobs by the processors to the dispatcher.

As a consequence, the desired result is achieved with a reduced exchange of information (among the processors and the dispatcher), resulting in significant efficiency increase.

Moreover, this result is achieved with a reduced usage of storage area of the dispatcher; as a consequence, the above-mentioned solution is scalable to a very high number of processors.

Figure 3:
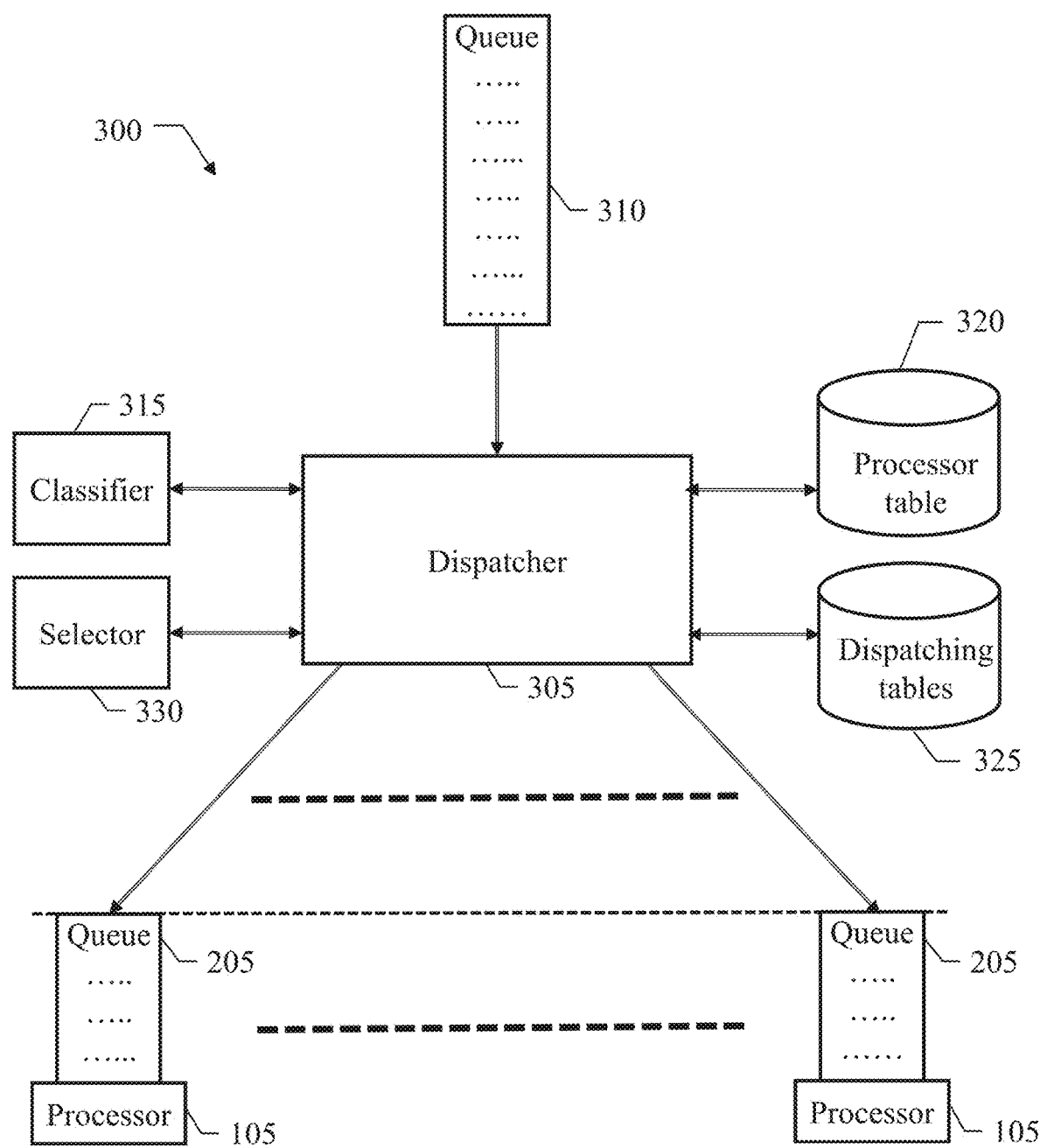
FIG. 3 shows software components that ay be used to implement embodiments of the present invention.

FIG. 3 shows software components that may be used to implement embodiments of the present invention.

Particularly, all the software components (programs and data) are denoted collectively by the reference numeral 300. The software components may be stored in the mass memory denoted by reference numeral 115 in FIG. 1 and loaded (at least partially) into the working memory of the above-described computing system 100 in FIG. 1 when the programs are running, together with an operating system and other application programs (not shown in FIG. 1). The programs are initially installed into the mass memory, for example, from removable storage units or from a network (such as the Internet). In this respect, each program may be a module, segment or portion of code, which comprises one or more executable instructions for implementing the specified logical function. The instructions of each program are executable by any processor of the processors 105.

Particularly, a dispatcher 305 (running on one processor of the processors 105) controls the submission of the jobs to all of the processors 105. For this purpose, the dispatcher 305 accesses a (dispatcher) queue 310 (with a FIFO structure) for the jobs that are to be executed. The jobs to be executed are added to the queue 310 by one or more corresponding sources (for example, the network cards of the switch) and the jobs are removed from the queue 310 by the dispatcher 305 when the jobs are submitted to the processors 105 for execution of the jobs. The dispatcher 305 interacts with a classifier 315, which implements the classification of the jobs. The dispatcher 305 accesses (in read mode only) a processor table 320, which stores the queue size of each processor. The dispatcher 305 controls (in read/write mode) one or more dispatching tables 325, which store information used to identify the last processor 105 of each class and to determine the delta number the queue 205 of the last processor 105 (as describedinfra). The dispatcher 305 interacts with a selector 330, which implements the selection of the processor 105 for the submission of each new job when the processor 105 may be chosen freely.

The dispatcher 305 operates (for the submission of the jobs to the processors 105) in a blind mode. Particularly, the submission of the jobs is implemented with a basic feedback mechanism, wherein each processor 105 accepts (when the queue 205 of the processor 105 is not full) or refuses (when the queue 205 of the processor 105 is full) the submission of each job thereto. The dispatcher 305 instead has no visibility of the operation of the processors 105. Particularly, the dispatcher 305 is completely agnostic about the execution and completion of the jobs by the processors 105 and about the conditions of the queues 205 of the processors 105 (i.e., the number of jobs that are currently queued in the queues 205).

Figure 4:
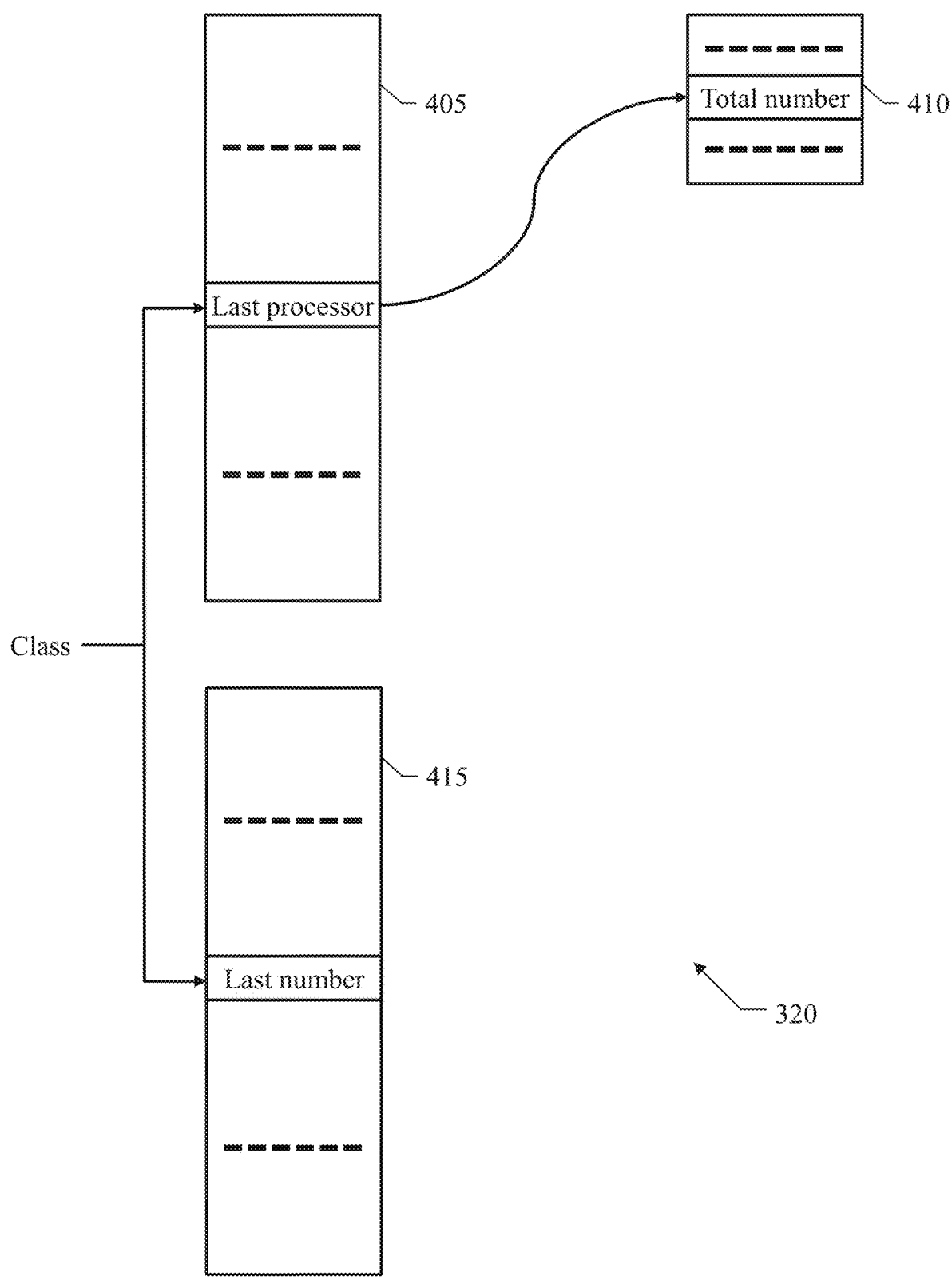
FIG. 4 shows an exemplary data structure that may be used to implement embodiments of the present invention.

FIG. 4 shows an exemplary data structure that may be used to implement embodiments of the present disclosure.

Particularly, the above-mentioned dispatching tables 325 comprise a last processor table 405, a total number table 410, and a last number table 415. In one embodiment, the tables 405, 410 and 415 are completely internal to the dispatcher 305 and not connected to the processors 105.

The last processor table 405 comprises an entry for each class, for example, accessed by a corresponding (unique) class identifier. The entry of each class contains an indication of a last processor of the class, to which a last job of the class has been submitted, for example, a corresponding (unique) processor identifier. At the beginning (for example, at a starting time when the computing system 100 is switched on), each entry of the last processor table 405 is initialized to a null value (meaning no value).

The total number table 410 comprises an entry for each processor, for example, accessed by the corresponding processor identifier. The entry of each processor contains a total number of the jobs (of any class) that have been submitted to the processor from the starting time, comprising both the jobs that have already been executed and the jobs that are still waiting in the processor's queue to be executed. At the beginning, each entry of the total number table 410 is initialized to zero.

The last number table 415 comprises an entry for each class, for example, again accessed by the corresponding class identifier. The entry of each class contains a last number of the class, which indicates the total number of the last processor of the class at the submission of the last job of the class thereto. At the beginning, each entry of the last processor table 405 is initialized to a null value (meaning no value).

Figure 5A:
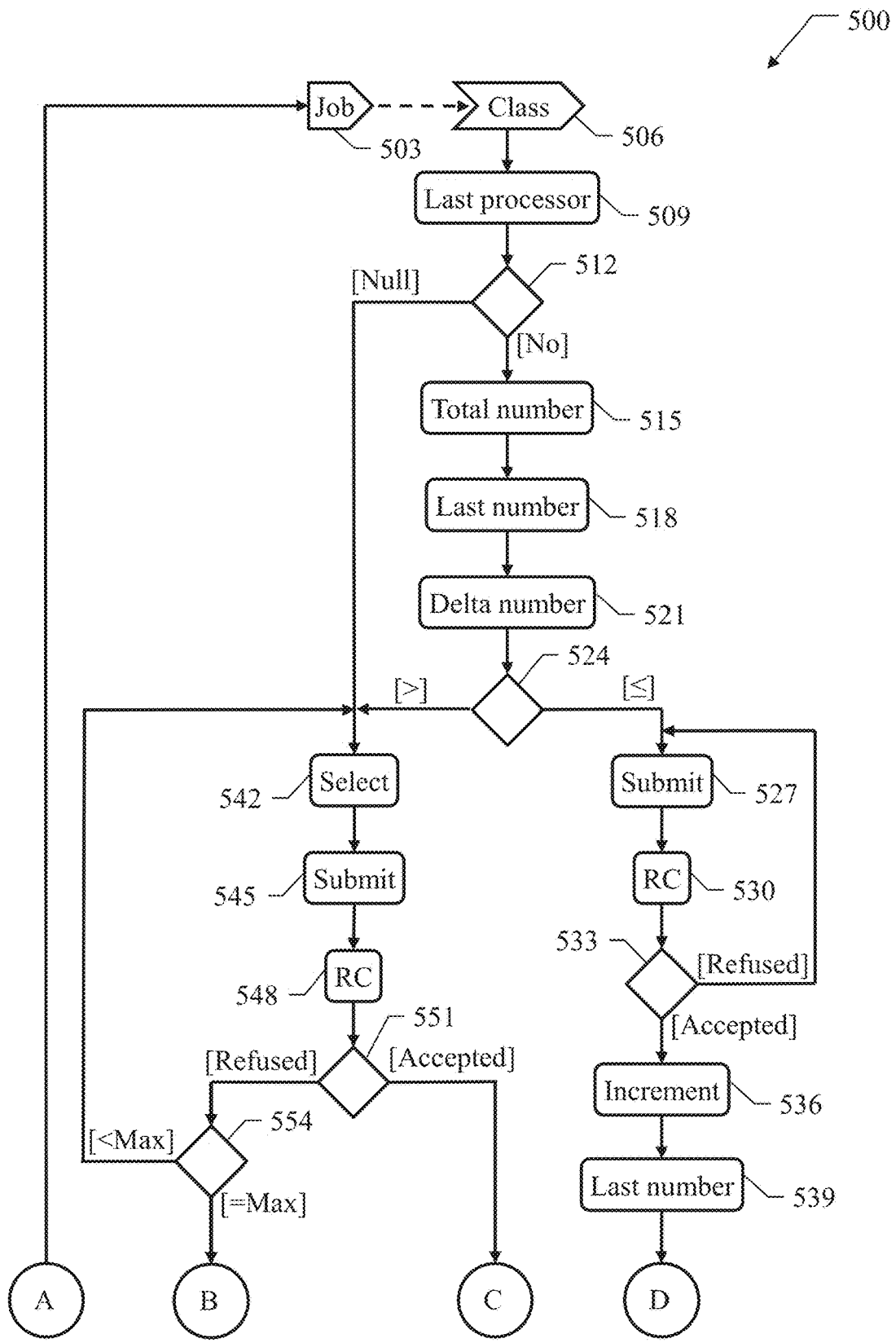
FIGS. 5A-5B shows a flow chart for describing methods of the present invention, in accordance with embodiments of the present invention.
Figure 5B:
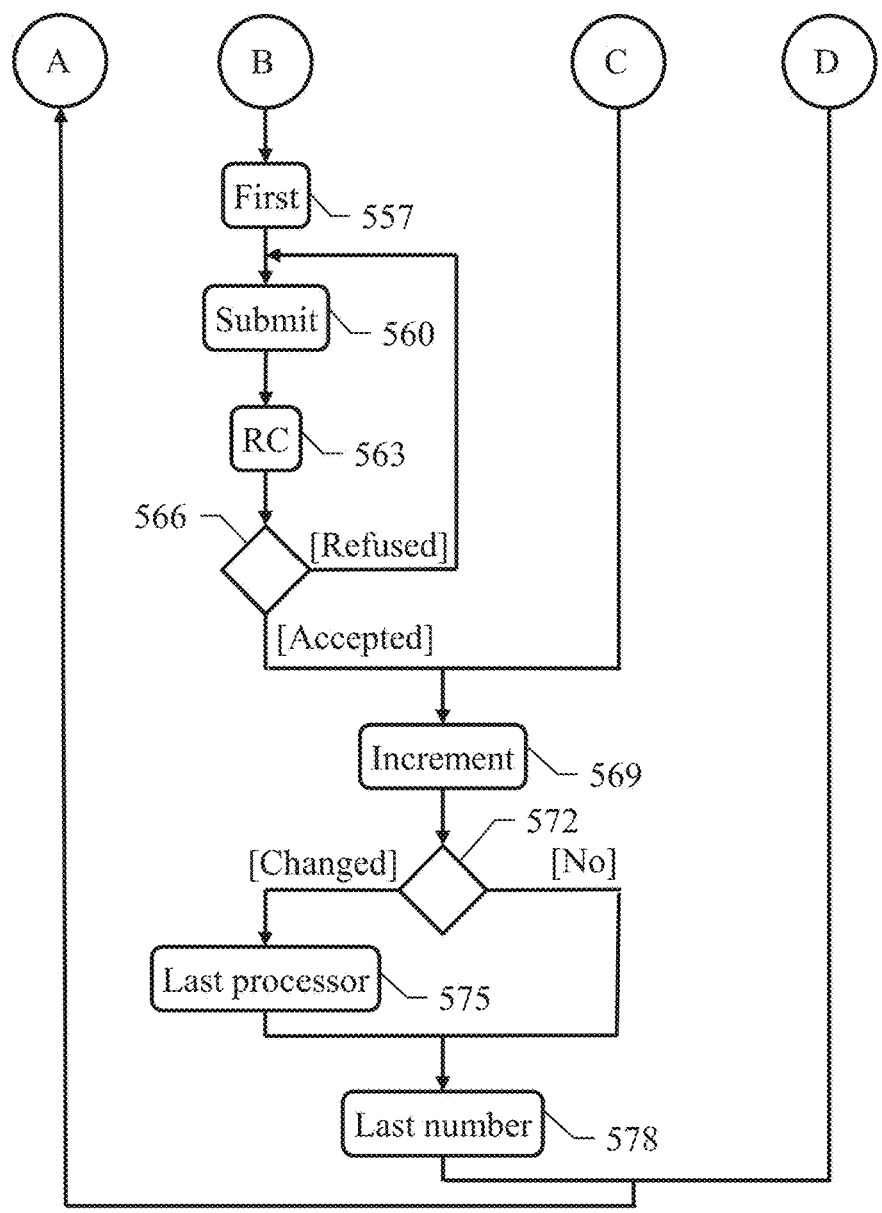

FIGS. 5A-5B shows a flow chart for describing a method of the present invention, in accordance with embodiments of the present invention. The method described in FIGS. 5A-5B may be implemented by (i) circuitry and/or (ii) program code executable by one or more processors of the processors 105 via one or more memories of the main memory 115. The program code executable by the one or more processors may be stored in one or more hardware storage devices or hardware storage media.

Particularly, the flow chart in FIGS. 5A-5B represents an exemplary process (which may be used to control the dispatching of the jobs for execution of the jobs by the processors) with a method 500. In this respect, each block of the diagram may correspond to one or more executable instructions and/or steps for implementing the specified logical function in the computing system 100.

The dispatcher 305 implements a continuous loop for processing the jobs to be executed. Starting from block 503, the dispatcher 305 is waiting for any request of execution of a new job, represented by the job's availability at the head of the (dispatcher) queue. In response to detecting a request for the new job, the dispatcher extracts the new job from the queue (at the same time removing the new job from the queue and then causing the shifting forwards of any next jobs present in the queue)

The process than passes to block 506, wherein the classifier determines the (current) class of the new job. In one embodiment, the classification of the new job is based on a hashing technique. For this purpose, the classifier determines a signature of the new job defined by one or more parameters. For example, when the jobs are data frames, the signature may be defined by a combination (e.g., a concatenation) of a network address of the source device of the data frame and a network address of the destination device of the data frame (which are extracted from a header of the data frame). The classifier then calculates a hash value by applying a hash function to the signature of the new job. The classifier truncates the hash value to the hash value's most significant bits corresponding to a number of the classes (for example, 14 bits for 16,384 classes). The truncated hash value so obtained defines the class identifier of the current class that is associated with the new job (hereinafter, referred to as current class identifier). In an embodiment of the present invention, the number of classes is far higher than the number of processors (for example, a multiple thereof by a high factor, such as a multiple of 50-50,000 in one embodiment, 100-10,000 in another embodiment, and 500-5,000 (e.g., 5,000) in yet another embodiment. The much higher number of classes than the number of processors improves the flexibility in the dynamic assignment of the classes to the processors (at the same time without requiring a too large storage area for the dispatching tables).

Continuing to block 509, the dispatcher reads the processor identifier of the last processor of the current class (hereinafter, referred to as last processor identifier) from the last processor table 405, by accessing the corresponding entry with the current class identifier. The flow of activity then branches at block 512 according to the value of the last processor identifier. Particularly, if the last processor identifier is not null (meaning that the last processor identifier actually indicates the last processor of the current class), the dispatcher at block 515 reads the total number of the last processor of the current class (hereinafter, referred to as current total number) from the total number table 410, by accessing the corresponding entry the last processor identifier. Continuing to block 518, the dispatcher reads the last number of the current class (hereinafter, referred to as current last number) from the last number table 415, by accessing the corresponding entry with the current class identifier. The dispatcher then calculates the delta number of the current last processor at block 521 (hereinafter, referred to as current delta number), by subtracting the current last number from the current total number.

A test is then made at block 524, wherein the dispatcher compares the current delta number with the queue size of the last processor of the current class (hereinafter, referred to as current queue size), for example, by retrieving the queue size from the processor table 320 being loaded at the beginning (by accessing a corresponding entry with the last processor identifier).

If the current delta number is lower than or equal to the current queue size (meaning that the new job has to be submitted to the current last processor), the dispatcher submits the new job to the current last processor in a blocking mode. For this purpose, the dispatcher implements a (waiting) loop waiting for acceptance of the submission of the new job by the current last processor. The loop begins at block 527, wherein the dispatcher attempts to submit the new job to the current last processor. In response thereto, the dispatcher receives a corresponding return code from the current last processor at block 530. The return code indicates whether the submission of the new job has been accepted or refused by the current last processor (when the queue of the current last processor is not full or full, respectively). With reference now to block 533, if the return code indicates that the submission of the new job to the current last processor has been refused (since the queue of the current last processor is full), the flow of activity returns to the block 527 to repeat the same operations.

Conversely, as soon as the return code indicates that the submission of the new job to the current last processor has been accepted (since a free location is now available in the queue of the current last processor), the loop is exited by descending into block 536. At this point, the dispatcher increments (by one) the total number of the last processor of the current class in the total number table 410. Continuing to block 539, the dispatcher sets the last number of the current class in the last number table 415 equal to the (incremented) total number of the last processor of the current class (by copying the total number from the total number table). The process then returns to the block 503 for processing a next new job (as soon as available).

Referring back to the block 512, if the last processor identifier is null (meaning that the new job is the first job of the current class since no previous job thereof has been submitted from the starting time), the process descends into block 542. Block 542 is also reached from the block 524 when the current delta number is higher than the current queue size. In both cases of reaching block 542, the new job may be omitted to any one of the processors. For this purpose, the selector 330 implements a (selection) loop for selecting the (selected) processor to which the new job will be submitted. The loop begins at the block 542, wherein the selector selects a (new) candidate processor for this selected processor (according to one or more selection criteria). For example, at a first iteration of the loop the candidate processor is determined by setting the candidate processor identifier (hereinafter, referred to as candidate processor identifier) equal to the current class identifier truncated to the current class identifier's most significant bits corresponding to the number of the processors (for example, 2-4 bits for 4-16 processors). The dispatcher then submits the new job to the candidate processor in a non-blocking mode. For this purpose, the dispatcher attempts to submit the new job to the candidate processor at block 545. In response thereto, the dispatcher receives the corresponding return code from the candidate processor at block 548 (as above indicating whether the submission of the new job to the candidate processor has been accepted or refused). With reference now to block 551, if the return code indicates that the submission of the new job to the candidate processor has been refused (since the candidate processor's queue is full), the flow of activity passes to block 554. At this point, the selector compares the number of repetitions of the loop (indicating the number of candidate processors to which the dispatcher has attempted to submit the new job without success) with a maximum number thereof that is acceptable (for example, 2-4). If the number of iterations has not reached the maximum number yet, the process returns to the block 542 to repeat the same operations on another (new) candidate processor. For this purpose, at each iteration of the loop, the candidate processor is determined in a decreasing order of preference. For example, the candidate processor is determined by incrementing the candidate processor identifier by one in modulus equal to the number of the processors.

Conversely, as soon as the number of iterations has reached the maximum number, the loop is exited by descending into block 557. At this point, the selector sets the selected processor equal to the candidate processor of the first iteration of the loop (with the candidate processor identifier becoming the processor identifier of the selected processor, hereinafter referred to as selected processor identifier). The dispatcher then submits the new job to the selected processor in a blocking mode. For this purpose, as above the dispatcher implements a (waiting) loop waiting for acceptance of the submission of the new job by the selected processor. The loop begins at block 560, wherein the dispatcher attempts to submit the new job to the selected processor. In response thereto, the dispatcher receives the corresponding return code from the selected processor at block 563 (again indicating whether the submission of the new job has been accepted or refused by the selected processor). With reference now to block 566, if the return code indicates that the submission of the new job to the selected processor has been refused (since the selected processor's queue is full), the flow of activity returns to the block 560 to repeat the same operations. Conversely, as soon as the return code indicates that the submission of the new job to the selected processor has been accepted (since a free location is now available in the selected processor's queue) the loop is exited by descending into block 569. The same point is also reached from the block 551 when the return code received from the candidate processor indicates that the submission of the new job thereto has been accepted (since a free location was available in the queue of the candidate processor), meaning that this candidate processor is the selected processor (with the candidate processor identifier becoming the selected processor identifier).

In this way, it is possible to limit the submissions of the new job in the non-blocking mode to the maximum number, which prevents locking contentions on the queues of the candidate processors that might be generated by the submissions of the new jobs in the non-blocking mode thereto, with a beneficial effect on the performance of the candidate processors and then of the whole computing system With reference now to the block 569, the dispatcher increments (by one) the total number of the selected processor in the total number table 410. A test is then made at block 572, wherein the dispatcher compares the selected processor identifier with the last processor identifier. If these identifiers are different (meaning that the selected processor, to which the new job has been submitted, is different from the last processor of the current class), the dispatcher at block 575 sets the processor identifier of the current class in the last processor table equal to the selected processor identifier. The process then continues to block 578; the same point is also reached directly from the block 572 when the selected processor identifier is equal to the last processor identifier (meaning that the last processor of the current ass has not changed). In block 578, the dispatcher sets the last number of the current class in the last number table equal to the (incremented) total number of the selected processor (by copying the total number from the total number table). The process then returns to the block 503 for processing a next new job (as soon as available).

In order to satisfy local and specific requirements, a person skilled in the art may apply many logical and/or physical modifications and alterations to the present invention. More specifically, although the present invention has been described with a certain degree of particularity with reference to one or more embodiments thereof, it should be understood that various omissions, substitutions and changes in the form and details as well as other embodiments are possible. Particularly, different embodiments of the present invention may, even be practiced without the specific details (such as the numerical values) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any embodiment of the present invention may be incorporated in any other embodiment as a matter of general design choice. In any case, each numerical value should be read as modified by errs about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relation (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for dispatching a plurality of jobs for execution in a computing system However, the computing system may be of any type (see below) and the jobs may be in any number and of any type (for example, defined at the level of instructions, transactions, unit of works, blocks of data)

In an embodiment, the computing system comprises a plurality of processors adapted to execute the jobs in parallel. However, the processors may be in any number and of any type, of a physical (i.e., hardware)nature (for example, cores, microprocessors, computers)

In an embodiment, each processor is associated with a queue size that is indicative of a maximum number of the jobs that may be queued to the processor (waiting for execution by the processor after submission for execution thereto). However, the queue may be of any type (for example, storing the actual definitions of the jobs or only pointers thereto) and of any size (defined either statically or dynamically, provided that it is always known to the dispatcher).

In an embodiment, the method comprises receiving a request of execution of a new job of the jobs. However, the request of execution of the new job may be received in any way (for example, with commands, messages, remote calls, even without any dispatcher queue).

In an embodiment, the method comprises assigning the new job to a current class of a plurality of classes; the classes are defined so as to have the jobs of different classes with no execution dependencies. However, the classes may be in any number and defined according to any number and type of execution dependencies based on any number and type of characteristics of the jobs (for example, instructions, communication protocols, ports). Moreover, the new job may be assigned to the current class according to any hash function (for example, based on the whole data frames) or more generally in any other way (for example, with a decision tree).

In an embodiment, the method comprises retrieving an indication of a last processor of the processors of the current class to which a last job of jobs of the current class has been submitted for execution. However, the last processor may be indicated in any way (for example, by its position, name, address) and may be retrieved in any way (for example, from a corresponding variable maintained in the working memory).

In an embodiment, the method comprises retrieving an indication of a delta number of the jobs that have been submitted for execution to the last processor of the current class after the last job of the current class. However, the delta number may be retrieved in any way (for example, either directly or calculated from other values).

In an embodiment, the method comprises submitting the new job for execution to a submission processor of the processors.. The submission processor is set to the last processor of the current class or to a selected processor of the processors according to a comparison between the delta number and the queue size of the last processor of the current class. However, the new job may be submitted for execution in any way (for example, with a command, a message, providing its whole content or simply a corresponding pointer he submission processor). Moreover, the submission processor may be determined in any way according to this comparison (even without the actual calculation of the delta number, which may be simply determined to be lower or higher than the queue size implicitly from other information).

In an embodiment, the step of submitting the new job for execution comprises submitting the new job for execution to the last processor of the current class (when the delta number is equal to or lower than the queue size of the last processor of the current class) or submitting the new job for execution to the selected processor (when the delta number is higher than the queue size of the last processor of the current class). However, the possibility of determining the submission processor according to different comparisons between the delta number and the queue size is not excluded (for example, discriminating between the delta number lower than the queue size and the delta number equal to or higher than the queue size when the execution dependencies only require maintaining the order of the start of execution of the jobs).

In an embodiment, a stored last processor memory structure associates each class of the classes with an indication of a last processor of the processors of the class to which a last job of jobs of the class has been submitted for execution. However, the last processor memory structure may be of any type (for example, a dedicated table, file or a part of a more complex data structure such as a column of a matrix) and the last processor may be indicated in any way (for example, by the last processor's position, name, address)

In an embodiment, the step of retrieving an indication of a last processor of the processors of the current class comprises reading the indication of the processor associated with the current class from the last processor memory structure. However, this indication of the processor may be read in any way (for example, with a dedicated API, a query).

In an embodiment, the step of submitting the new job for execution comprises (when the submission processor is the selected processor) associating an indication of the selected processor with the current class in the last processor memory structure. However, this "associating" operation may be performed in any way (for example, only when the selected processor differs from the last processor of the current class or always indiscriminately).

In an embodiment, a total number memory structure is stored that associates each processor of the processors with a total number of the jobs that have been submitted for execution to the processor from a starting time. However, the total number memory structure may be of any type (either the same or different with respect to the last processor memory structure) and the starting time may be defined in any way (for example, the beginning of every working period, such as day, week, month).

In an embodiment, a last number memory structure is stored that associates each class of the classes with a last number, which indicates the last number of the last processor of the class at the submission thereto of the last job of the class. However, the last number memory structure may be of any type (for example, either stand-alone or combined with the last processor memory structure) and the last number may be defined in any way according to the corresponding submission (for example, before or after the increment of the total number of the last processor of the class).

In an embodiment, the step of retrieving an indication of a delta number comprises reading the total number of the last processor of the current class from the total number memory structure. However, this total number of the last processor may be read in any way (either the same or different with respect to the reading of the indication of the last processor).

In an embodiment, the step of retrieving an indication of a delta number comprises reading the last number of the current class from the last number memory structure. However, this last number of the current class may be read in any way (either independently of or together with the reading of the indication of the last processor).

In an embodiment, the step of retrieving an indication of a delta number comprises calculating the delta number according to a difference between the total number of the last processor of the current class and the last number of the current class. However, the delta number may be calculated in any way (for example, by incrementing or decrementing the difference according to the definition of the last number and/or of the execution dependencies).

In an embodiment, the step of submitting the new job comprises incrementing the total number associated with the submission processor in the total number memory structure. However, this "incrementing" operation may be performed in any way (for example, either before or after the submission of the new job).

In an embodiment, the step of submitting the new job comprises setting the last number of the current class in the last number memory structure according to the total number of the submission processor. However, this "setting" operation may be performed in any way (for example, either before or after the increment of this total number).

In an embodiment, the step of submitting the new job for execution comprises when the submission processor is the current processor) submitting the new job for execution to the current processor in a blocking mode, waiting for acceptance thereof by the current processor when a current number of the jobs being queued for execution thereto is lower than the queue size of the current processor. However, the possibility of submitting the new job to the current processor in a different way is not excluded (for example, by submitting the new job for execution in a non-blocking mode and repeating the determination of the submission processor when the submission of the new job to the current processor is refused).

In an embodiment, the step of submitting the new job for execution comprises when the submission processor is the selected processor) selecting the selected processor according to one or more preference criteria. However, the selected processor may be selected according to any number and type of criteria (for example, according to the total number of the jobs that have been submitted to each processor). In any case, a random selection may be performed in one embodiment.

In an embodiment, the step of submitting the new job for execution comprises (when the submission processor is the selected processor) a selection iteration that is implemented by repeating the following steps.

In an embodiment, the selection iteration comprises determining a new candidate processor of the processors for the selected processor. However, the candidate processor may be determined in any way (for example, from among all the processors or from only some of the processors associated with the current class).

In an embodiment, the selection iteration comprises attempting to submit the new job for execution to the candidate processor. However, this operation of "attempting to submit the new job" may be performed in any way (for example, interrogating the candidate processor for the candidate processor's availability before submitting the new job).

In an embodiment, the selection iteration comprises receiving a return code from the candidate processor in response to the attempting to submit the new job for execution thereto. However, the return code may be received in any way (for example, always, or only in specific circumstances such as when the submission of the new job is refused).

In an embodiment, the selection iteration is repeated until an exit condition of the selection iteration is fulfilled. The fulfillment of the exit condition of the selection iteration comprises the return code from the candidate processor being indicative of acceptance of the submission of the new job by the candidate processor (when a current number of the jobs being queued for execution thereto is lower than the queue size of the candidate processor). However, the possibility of submitting the new job to a single candidate processor in a blocking mode (directly defining the selected processor) is not excluded.

In an embodiment, the fulfillment of the exit condition of the selection iteration comprises a maximum number of repetitions of the selection iteration being reached. However, the maximum number may have any value. In any case, the possibility is not excluded of continually repeating the selection iteration until a candidate processor accepting the submission of the new job is found.

In an embodiment, the step of submitting the new job for execution comprises (in response to the fulfillment of the exit condition of the selection iteration without the acceptance of the submission of the new job by the candidate processor) submitting the new job for execution to the selected processor in a blocking mode, waiting for acceptance thereof by the selected processor when a current number of the jobs being queued for execution thereto is lower than the queue size of the selected processor. However, in this condition the new job may be submitted to the selected processor in a different way (for example, by repeating the selection iteration if the submission of the new job to the selected processor is not accepted within a maximum waiting time).

In an embodiment, the step of submitting the new job for execution to the selected processor in a blocking mode comprises setting the selected processor to the candidate processor of a first repetition of the selection iteration. However, the selected processor may be set to any other candidate processor (for example, the candidate processor of the last repetition of the selection iteration) or even independently thereof.

In an embodiment, the step of submitting the new job for execution to the current processor in a blocking mode and/or the step of submitting the new job for execution to the selected processor in a blocking mode comprise a waiting iteration that is implemented by repeating the following steps (for each blocking processor consisting of the current processor and/or the selected processor, respectively).

In an embodiment, the waiting iteration comprises attempting to submit the new job for execution to the blocking processor. However, this "waiting" operation may be performed in any way (either the same or different with respect to the submission to the candidate processor)

In an embodiment, the waiting iteration comprises receiving a return code from the blocking processor in response to the attempting to submit the new job for execution thereto. However, the return code may be received in any way (either the same or different with respect to the submission to the candidate processor).

In an embodiment, the waiting iteration is repeated until the return code from the blocking processor is indicative of acceptance of the submission of the new job by the blocking processor. However, the submission to the blocking processor in the blocking mode may be implemented in any way (for example, waiting for a notification, from the blocking processor, of the blocking processor's availability).

In an embodiment, said step of submitting the new job for execution to a submission processor of the processors comprises submitting the new job for execution to the submission processor in a blind mode without receiving any notification of completion of the execution of the new job by the submission processor. However, the possibility of having feedback about the execution of the jobs from the submission processor is not excluded (for example, when an error occurs during execution of the new job).

In an embodiment, a number of the classes is higher than a number of the processors. However, the classes and the processors may be in any number (either in absolute term or in relative term).

Generally, similar considerations apply if the same solution is implemented with an equivalent method (by using similar steps with the same functions of more steps or portions thereof, removing some steps being non-essential, or adding further optional steps). Moreover, the steps may be performed in a different order, concurrently o an interleaved way (at least in part).

An embodiment provides a computer program configured for causing a processing system perform the above-mentioned method when the computer program is executed on the processing system. An embodiment provides a computer program product, the computer program product comprising a computer readable storage medium having program instructions embodied therewith, the program instructions executable by a processing system to cause the processing system to perform the same method. However, the computer program may be implemented as a stand-alone module, as a plug-in for a pre-existing program (for example, the dispatcher), or even directly in the dispatcher. In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet n Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computing system or computer system of the present invention comprises one or more processors, one or more memories, and one or more computer readable hardware storage devices, said one or more hardware storage device containing program code executable by the one or more processors via the one or more memories to implement the methods of the present invention.

An embodiment provides a dispatching system comprising means configured for performing methods of the present invention. An embodiment of the present invention provides a dispatching system comprising a circuitry (i.e., any hardware suitably configured, for example, by software) for performing each step of the same method; particularly, an embodiment provides a dispatching system for dispatching a plurality of jobs for execution in a computing system comprising a plurality of processors configured to execute the jobs in parallel, each processor being associated with a queue size indicative of a maximum number of the jobs that may be queued to the processor waiting for execution by the processor after submission for execution thereto, wherein the dispatching system comprises a circuitry for receiving a request of execution of a new job of the jobs, a circuitry for assigning the new job to a current class of a plurality of classes, the classes being defined to have the jobs of different classes without execution dependencies, a circuitry for retrieving an indication of a last processor of the processors of the current class to which a last one of jobs of the current class has been submitted for execution, a circuitry for retrieving an indication of a delta number of the jobs being submitted for execution to the last processor of the current class after the last job of the current class, and a circuitry for submitting the new job for cation to a submission processor of the processors, the submission processor being set to the last processor of the current class or to a selected one of the processors according to a comparison between the delta number and the queue size of the last processor of the current class. However, the dispatching system may be of any type (for example, hardware and/or software) and the dispatching system may be either integrated in the computing system or provided as a stand-alone product.

An embodiment provides a computing system comprising a plurality of processors configured to execute a plurality of jobs in parallel (each processor being associated with a queue size indicative of a maximum number of the jobs that may be queued to the processor, waiting for execution by the processor after submission for execution thereto) and the above-mentioned dispatching system for dispatching the jobs for execution in the computing system. However, the method may also be carried out on any stand-alone or distributed computing system (for example, a microprocessor, a computer, a network, a cloud environment) exploiting any type of (wired and/or wireless) connections; the computing system may have any architecture (for example, cc-NUMA, cluster, local, wide area, global, cellular or satellite network), with the processors that may be of any type (either equal or different among them) and tightly coupled, loosely coupled or completely uncoupled among them. It would be readily apparent that it is also possible to deploy the same solution as a service that is accessed through a network (such as in the Internet), Generally, similar considerations apply if the dispatching system and the computing system each has a different structure or comprises equivalent components or has other operative characteristics. In any case, every component thereof may be separated into more elements, or two or more components may be combined together into a single element. Moreover, each component may be replicated to support the execution of the corresponding operations in parallel. Moreover, unless specified otherwise, any interaction between different components generally does not need to be continuous, and may be either direct or indirect through one or more intermediaries.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for dispatching a plurality of jobs for execution in a computing system comprising a plurality of processors configured to execute the jobs in parallel, said plurality of processors comprising one or more processors, each processor of the plurality of processors being associated with a queue having a queue size equal to a maximum number of jobs that may be in the queue while the jobs in the queue are waiting to be executed by the processor associated with the queue, said method comprising:

retrieving, by the one or more processors, an indication of a last processor of the processors of a current class to which a last job of jobs of the current class has been submitted for execution, wherein a new job of the plurality of jobs has been assigned to the current class, wherein a request has been received for execution of the new job, wherein a plurality of classes comprise the current class, and wherein jobs of different classes of the plurality of classes do not have execution dependencies;

retrieving, by the one or more processors, an indication of a delta number of the jobs being submitted for execution to the last processor of the current class after the last job of the current class; and submitting, by the one or more processors, the new job for execution to a submission processor of the plurality of processors, said submission processor being set to a selected processor of the plurality of processors according to a comparison between the delta number and the queue size of the last processor of the current class.

2. The method of claim 1, wherein said submitting the new job for execution comprises:
   submitting the new job for execution to the last processor of the current class in response to a determination that the delta number is equal to or lower than the queue size of the last processor of the current class; or
   submitting the new job for execution to the selected processor in response to a determination that the delta number is higher than the queue size of the last processor of the current class.

3. The method of claim 1, wherein a last processor memory structure associates each class with an indication of a last processor of the processors of one class to which a last job of jobs of the one class has been submitted for execution, said retrieving an indication of a last processor of the processors of the current class comprising:
   reading the indication of the processor associated with the current class from the last processor memory structure;
   said submitting the new job for execution comprising, in response to a determination that the submission processor is the selected processor, associating an indication of the selected processor with the current class in the last processor memory structure.

4. The method of claim 1, wherein a total number memory structure associates each processor of the plurality of processors with a total number of the jobs being submitted for execution to each processor from a starting time, wherein a last number memory structure associates each class with a last number indicating the total number of the last processor of each class at a submission thereto of the last job of each class, said retrieving an indication of a delta number comprising:
   reading the total number of the last processor of the current class from the total number memory structure;
   reading the last number of the current class from the last number memory structure; a
   calculating the delta number according to a difference between the total number of the last processor of the current class and the last number of the current class, said submitting the new job comprising:
      incrementing the total number associated with the submission processor in the total number memory structure; and
      setting the last number of the current class in the last number memory structure according to the total number associated with the submission processor.

5. The method of claim 1, wherein said submitting the new job for execution comprises, in response to a determination that the submission processor is the current processor:
   submitting the new job for execution to the current processor in a blocking mode and waiting for acceptance, by the current processor, of the new job for execution in response to a determination that a current number of the jobs being queued for execution by the current processor is lower than the queue size of the current processor.

6. The method of claim 1, wherein said submitting the new job for execution comprises, in response to a determination that the submission processor is the selected processor:
   selecting the selected processor according to one or more selection criteria.

7. The method of claim 1, wherein said submitting the new job for execution comprises, in response to a determination that the submission processor is the selected processor, executing each iteration of a loop that comprises one or more iterations, wherein for each iteration said executing comprises:
   determining a new candidate processors of the plurality of processors for the selected processor;
   attempting to submit the new job for execution to the candidate processor; and
   receiving a return code from the candidate processor in response to said attempting to submit the new job for execution to the candidate processor;
   exiting the loop if an exit condition is fulfilled, wherein executing a last iteration of the loop comprises determining that the exit condition is fulfilled in the last iteration.

8. The method of claim 7, wherein the exit condition is that a maximum number of repetitions of the iterations is reached, said submitting the new job for execution comprising, in response to said determining that the exit condition is fulfilled without acceptance of the submission of the new job by the candidate processor:
   submitting the new job for execution to the selected processor in a blocking mode and waiting for acceptance of the submission of the new job by the selected processor in response to a determination that a current number of the jobs being queued for execution by the selected processor is lower than the queue size of the selected processor.

9. The method of claim 7, wherein the exit condition is that the return code from the candidate processor is indicative of acceptance of the submission of the new job by the candidate processor, wherein the acceptance of the submission of the new job by the candidate processor is in response to a determination that a current number of the jobs being queued for execution by the candidate processor is lower than the queue size of the candidate processor.

10. The method of claim 1, wherein said submitting the new job for execution to the submission processor comprises:
   submitting the new job for execution to the submission processor in a blind mode without receiving any notification of completion of the execution of the new job by the submission processor.

11. The method of claim 1, wherein a number of the classes is higher than a number of the processors of the plurality of processors.

12. A computer program product, the computer program product comprising one or more computer readable hardware storage devices having computer readable program code stored therein, said program code containing instructions executable by one or more processors to implement method for dispatching a plurality of jobs for execution in a computing system comprising a plurality of processors configured to execute the jobs in parallel, said plurality of processors comprising the one or more processors, each processor of the plurality of processors being associated with a queue having a queue size equal to a maximum number of jobs that may be in the queue while the jobs in the queue are waiting to be executed by the processor associated with the queue, said method comprising:
   retrieving, by the one or more processors, an indication of a last processor of the processors of a current class to which a last job of jobs of the current class has been submitted for execution, wherein a new job of the plurality of jobs has been assigned to the current class, wherein a request has been received for execution of the new job, wherein a plurality of classes comprise the current class, and wherein jobs of different classes of the plurality of classes do not have execution dependencies;

retrieving, by the one or more processors, an indication of a delta number of the jobs being submitted for execution to the last processor of the current class after the last job of the current class; and submitting, by the one or more processors, the new job for execution to a submission processor of the plurality of processors, said submission processor being set to a selected processor of the plurality of processors according to a comparison between the delta number and the queue size of the last processor of the current class.

13. The computer program product of claim 12, wherein said submitting the new job for execution comprises:

submitting the new job for execution to he last processor of the current class in response to a determination that the delta number is equal to or lower than the queue size of the last processor of the current class; or submitting the new job for execution to the selected processor in response to a determination that the delta number is higher than the queue size of the last processor of the current class.

14. The computer program product of claim 12, wherein a total number memory structure associates each processor of the plurality of processors with a total number of the jobs being submitted for execution to each processor from a starting time, wherein a last number memory structure associates each class with a last number indicating the total number of the last processor of each class at a submission thereto of the last job of each class, said retrieving an indication of a delta number comprising:

reading the total number of the last processor of the current class from the total number memory structure;

reading the last number of the current class from the last number memory structure; and calculating the delta number according to a difference between the total number of the last processor of the current class and the last number of the current class, said submitting the new job comprising:

incrementing the total number associated with the submission processor in the total number memory structure; and setting the last number of the current class in the last number memory structure according to the total number associated with the submission processor.

15. A computing system, comprising a plurality of processors that includes one or more processors, one or more memories, and one or more computer readable hardware storage devices, said one or more hardware storage device containing program code executable by the one or more processors via the one or more memories to implement a method for dispatching a plurality of jobs for execution in the computing system, said plurality of processors configured to execute the jobs in parallel, each processor of the plurality of processors being associated with a queue having a queue size equal to a maximum number of jobs that may be in the queue while the jobs in the queue are waiting to be executed by the processor associated with the queue, said method comprising:

retrieving, by the one or more processors, an indication of a last processor of the processors of a current class to which a last job of jobs of the current class has been submitted for execution, wherein a new job of the plurality of jobs has been assigned to the current class, wherein a request has been received for execution of the new job, wherein a plurality of classes comprise the current class, and wherein jobs of different classes of the plurality of classes do not have execution dependencies;

retrieving, by the one or more processors, an indication of a delta number of the jobs being submitted for execution to the last processor of the current class after the last job of the current class; and submitting, by the one or more processors, the new job for execution to a submission processor of the plurality of processors, said submission processor being set to a selected processor of the plurality of processors according to a comparison between the delta number and the queue size of the last processor of the current class.

16. The computing system of claim 15, wherein said circuitry for submitting the new job for execution comprises:

submitting the new job for execution to he last processor of the current class in response to a determination that the delta number is equal to or lower than the queue size of the last processor of the current class; or submitting the new job for execution to the selected processor in response to a determination that the delta number is higher than the queue size of the last processor of the current class.

17. The computing system of claim 15, wherein a total number memory structure associates each processor of the plurality of processors with a total number of the jobs being submitted for execution to each processor from a starting time, wherein a last number memory structure associates each class with a last number indicating the total number of the last processor of each class at a submission thereto of the last job of each class, said retrieving an indication of a delta number comprising:

reading the total number of the last processor of the current class from the total number memory structure;

reading the last number of the current class from the last number memory structure; and calculating the delta number according to a difference between the total number of the last processor of the current class and the last number of the current class, said submitting the new job comprising:

incrementing the total number associated with the submission processor in the total number memory structure; and setting the last number of the current class in the last number memory structure according to the total number associated with the submission processor.

18. The computing system of claim 15, herein said submitting the new job for execution comprises, in response to a determination that the submission processor is the current processor:

submitting the new job for execution to the current processor in a blocking mode and waiting for acceptance, by the current processor, of the new job for execution in response to a determination that a current number of the jobs being queued for execution by the current processor is lower than the queue size of the current processor.

19. The computing system of claim 15, wherein said submitting the new job for execution comprises, in response to a determination that the submission processor is the selected processor:

selecting the selected processor according to one or more selection criteria.

20. The computing system of claim 15, wherein said submitting the new job for execution comprises, in response to a determination that the submission processor is the selected processor, executing each iteration of a loop that comprises one or more iterations, wherein for each iteration said executing comprises:
  determining a new candidate processors of the plurality of processors for the selected processor;
  attempting to submit the new job for execution to the candidate processor; and
  receiving a return code from the candidate processor in response to said attempting to submit the new job for execution to the candidate processor;
exiting the loop if an exit condition is fulfilled, wherein executing a last iteration of the loop comprises determining that the exit condition is fulfilled in the last iteration.

* * * * *